United States Patent [19]

Ragusa et al.

[11] Patent Number: 5,409,514
[45] Date of Patent: Apr. 25, 1995

[54] AIR FILTER

[76] Inventors: Guiseppe Ragusa, 20 Arcade Way, Avondale Heights, Victoria 3034; Jimmy P. Bajada, 13 Lancia Drive, Keilor Downs, Victoria 3038, both of Australia

[21] Appl. No.: 196,257

[22] PCT Filed: Sep. 3, 1992

[86] PCT No.: PCT/AU92/00463
§ 371 Date: Feb. 15, 1994
§ 102(e) Date: Feb. 15, 1994

[87] PCT Pub. No.: WO93/04761
PCT Pub. Date: Mar. 18, 1993

[30] Foreign Application Priority Data

Sep. 3, 1991 [AU] Australia .................. PK8103

[51] Int. Cl.6 ............................ B01D 46/00
[52] U.S. Cl. ........................ 55/319; 55/322; 55/323; 55/325; 55/462; 55/523; 55/DIG. 17; 95/268
[58] Field of Search ............... 55/319, 320, 321, 322, 55/323, 325, 462, 485, 523, DIG. 17; 95/268

[56] References Cited

U.S. PATENT DOCUMENTS

| 1,223,101 | 4/1917 | Pacziga | 55/319 |
| 2,226,045 | 12/1940 | Baldwin | 55/319 |
| 2,966,233 | 12/1960 | Nelson | 55/462 |
| 3,527,027 | 9/1970 | Knight et al. | |
| 3,796,025 | 3/1974 | Kasten | 55/DIG. 17 |
| 4,662,907 | 5/1987 | Yoshida | |
| 4,848,988 | 7/1989 | Suzuki | |
| 4,848,989 | 7/1989 | Maeda | |
| 4,925,466 | 5/1990 | Overby | 55/319 |

FOREIGN PATENT DOCUMENTS 1236396 6/1971 United Kingdom .
WO88/02658 4/1988 WIPO .

Primary Examiner—Charles S. Bushey
Attorney, Agent, or Firm—Oliff & Berridge

[57] ABSTRACT

An air filter includes an inlet for compressed air, a prefiltration chamber into which air from the inlet passes, a porous filter through which air from the prefiltration chamber passes to strain particular matter from the air, a plurality of venturis through which air from the porous filter passes, an expansion chamber in which air from the venturis expands and cools so that droplets of oil and water precipitate and accumulate at the bottom of the expansion chamber, and an outlet for air from the expansion chamber.

8 Claims, 2 Drawing Sheets

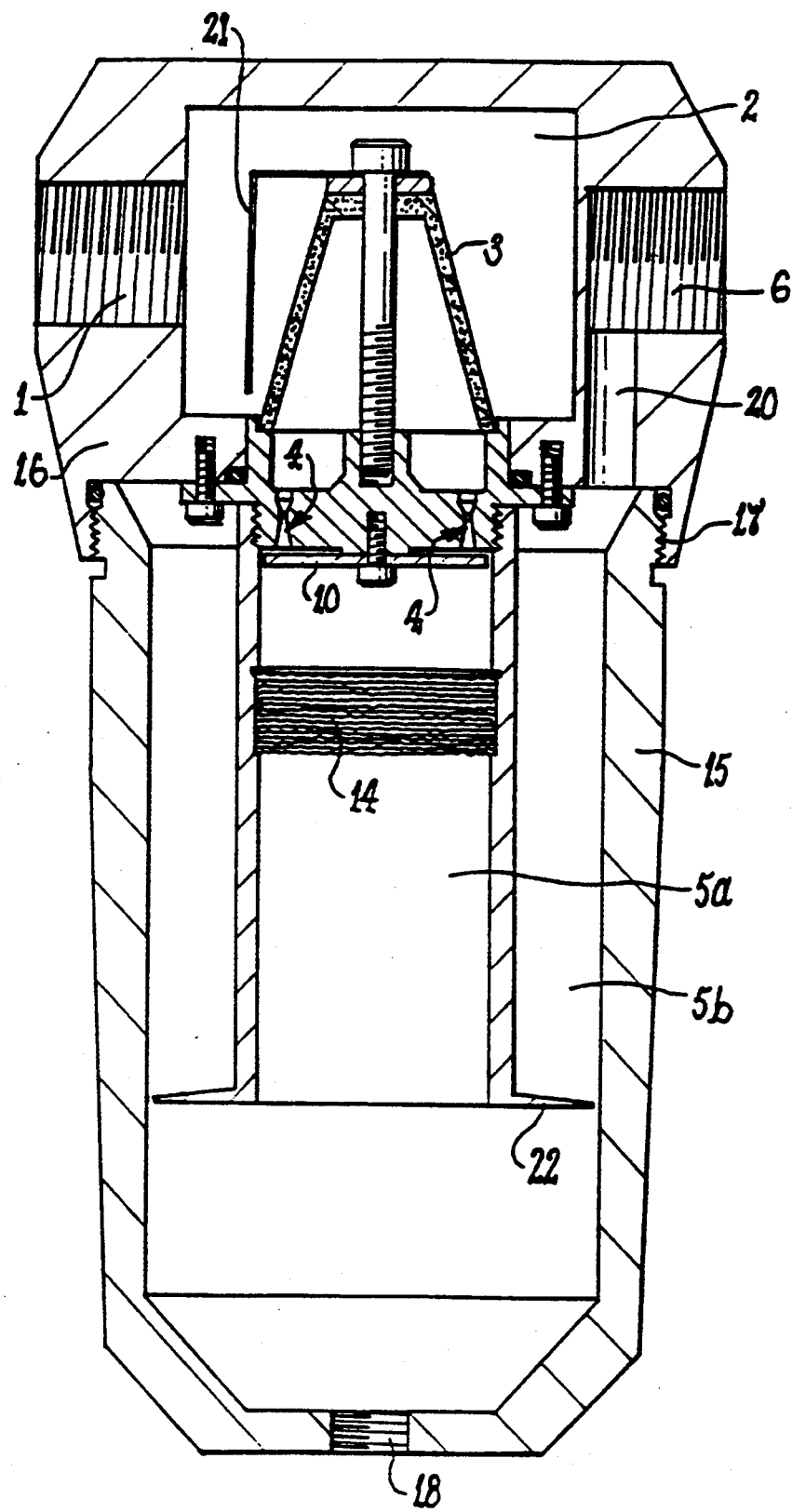
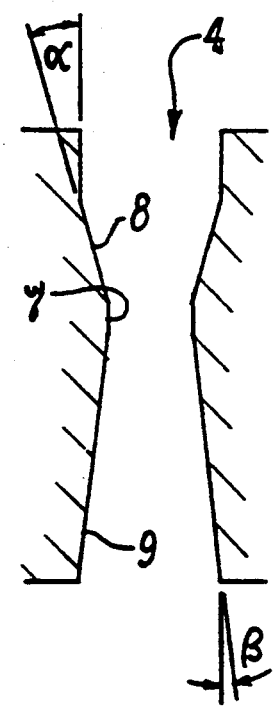
FIG 1
FIG 3

AIR FILTER

BACKGROUND OF THE INVENTION

1. Field of the Invention

This invention relates to an air filter. It relates particularly to an air filter for removing particulate matter, water and oil, whether in the form of vapour or droplets, from compressed air systems such as air braking systems.

2. Description of the Prior Art

Hot compressed air has a greater propensity for carrying water and oil vapour and suspended water and oil droplets and other particles than has non-compressed room temperature air. It is therefore frequently important for filtering apparatus to be provided for removing contaminants from a system which utilizes compressed air.

Conventional systems for removing contaminants have involved cooling by means of an air cooler which encourages precipitation of water and oil vapours, followed by passage through a porous filter medium which removes suspended water and oil droplets and other foreign particles. However, the air coolers used in such systems have generally been large and expensive, and the porous filter medium has generally become blocked in a short period of time so that frequent maintenance or replacement has been required.

Over the past few years, more efficient means of removing vapours from compressed air have been developed. Examples of these new types of humidity removers are given in U.S. Pat. No. 4,662,907, International Publication No. WO88/02658 and U.S. Pat. No. 4,848,988. Each of these specifications describes a device having an inner cylinder completely encompassed within an outer cylinder. Compressed air is injected through flared nozzles located near the top of the inner cylinder, and the inner cylinder functions as an expansion chamber in which the air expands rapidly and so cools adiabatically. Cooling results in precipitation of vapours, and the devices described in U.S. Pat. No. 4,662,907 and International Publication No. WO88/02658 provide filter nets across the inner chamber to trap droplets so precipitated. The device disclosed in U.S. Pat. No. 4,848,988 relies on a baffle plate to trap precipitated droplets. The water and oil then flows down the sides of the inner chamber and accumulates at the bottom of the outer chamber, from which it may be removed by an outlet port. The dried air passes from the bottom of the inner chamber into the outer chamber and out through an outlet port at the top of the outer cylinder.

While these types of filters are effective in removing oil and water from compressed air, it has been found that after a short period of use the flared injection nozzles located at the top of the inner cylinder frequently become blocked by particles, oil and moisture, so that regular servicing is required.

SUMMARY OF THE INVENTION

It is an object of the present invention to provide an air filter overcoming some of these disadvantages.

According to the present invention, there is provided an air filter comprising:
  an inlet for compressed air;
  a prefiltration chamber into which air from the inlet passes;
  porous filter means through which air from the prefiltration chamber passes, to strain particulate matter from the air;
  a plurality of venturis through which air from the prefiltration chamber passes;
  an expansion chamber in which air from the venturis expands and cools so that droplets of air and water precipitate and accumulate at the bottom of the expansion chamber; and
  an outlet for air from the expansion chamber.

It is preferred that a baffle be provided between the inlet and the porous filter means in the prefiltration chamber in order to disperse the air around the prefiltration chamber so that the full impact of incoming air is not directed only against one part of the porous filter means.

It is further preferred that the porous filter means be substantially cylindrical, conical or frusto-conical in shape with a flat base, such that air passes through the filter means into a substantially hollow core and out through the base towards the venturis.

It is preferred that a condensation accumulator plate be provided in the expansion chamber directly adjacent the venturis such that air, oil and moisture from the venturis passes directly onto the condensation accumulator plate.

It is further preferred that the expansion chamber comprise an internal chamber and an external chamber such that air from the venturis passes first through the internal chamber and then through the external chamber.

BRIEF DESCRIPTION OF THE DRAWINGS

The invention will hereinafter be described in greater detail by reference to the attached drawings which show an example form of the invention. It is to be understood that the particularity of those drawings does not supersede the generality of the preceding description of the invention.

FIG. 1 is a side cross-sectional view of an embodiment of apparatus according to the present invention.

FIG. 3 is an enlarged cross-sectional view of a venturi of the type used in the embodiments of FIG. 1 and FIG. 2.

DESCRIPTION OF THE PREFERRED EMBODIMENTS

Figure 2:
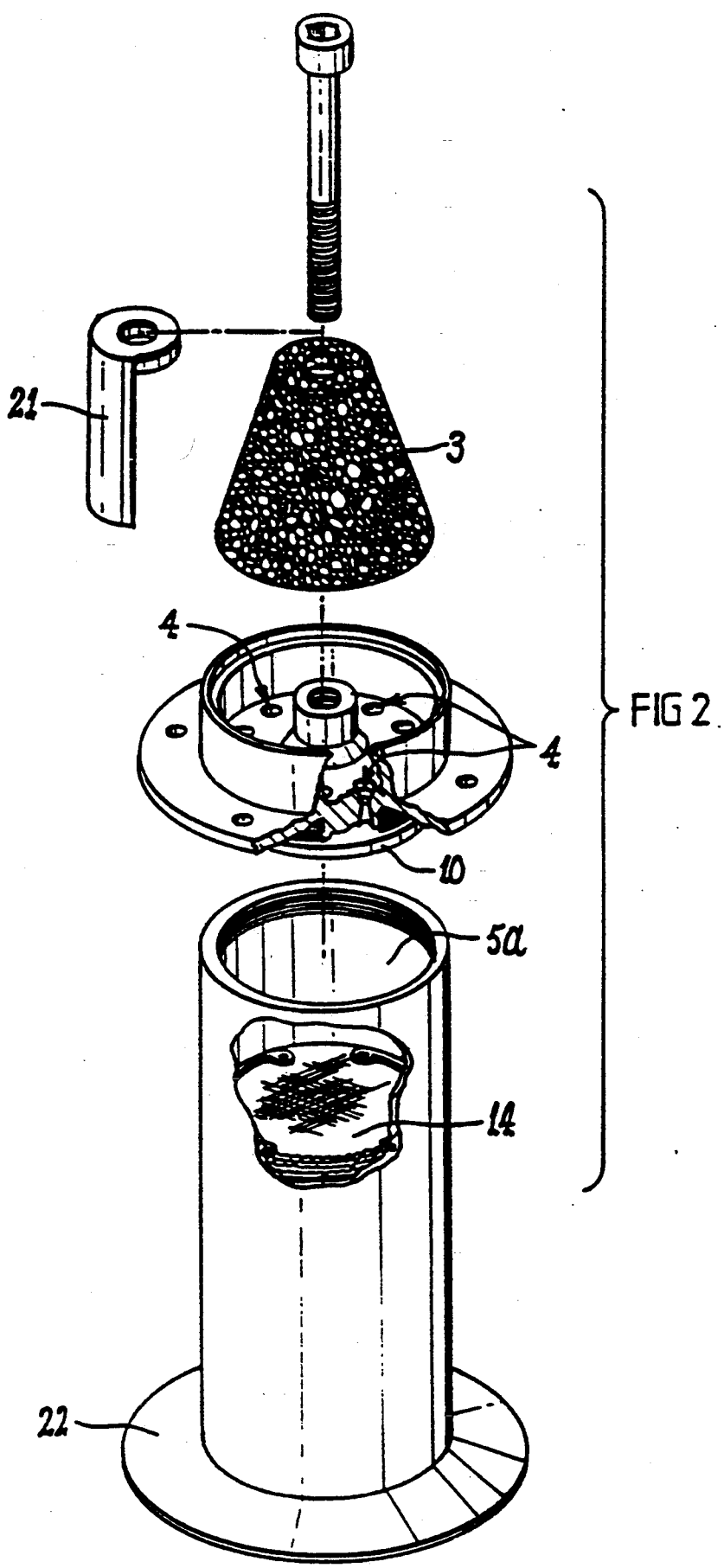
FIG. 2 is an exploded perspective view of some components of an alternative embodiment of the present invention.

The air filter illustrated in FIG. 1 comprises inlet 1 for compressed air, prefiltration chamber 2 into which air from inlet 1 passes, porous filter means 3 through which air from prefiltration chamber 2 passes, to strain particulate matter from the air, a plurality of venturis 4 through which air from prefiltration chamber 2 passes, expansion chamber 5A, 5B in which air from venturis 4 expands and cools so that droplets of oil and water precipitate and accumulate at the bottom of the expansion chamber, and outlet 6 for air from expansion chamber 5A, 5B.

Air inlet 1 and outlet 6 may be of any suitable size and configuration. It is preferred that they be of a size and configuration to suit existing parts for compressed air systems, and in one configuration they may include internal screw threads to enable compressed air pipes or tubes having external screw threads to be screwed into firm engagement. In one preferred arrangement, inlet 1 and outlet 6 comprise circular apertures which are approximately 2 cm in diameter.

Prefiltration chamber 2 may be of any suitable size and shape. There are no practical limitations in this regard, and in one preferred embodiment prefiltration chamber 2 is cylindrical in shape having a diameter of approximately 4 cm and a height of approximately 6 cm.

It is preferred that a baffle 21 be provided between inlet 1 and porous filter means 3, in order to disperse the air around prefiltration chamber 2 so that the full impact of incoming air is not directed only against that part of filter means 3 which is nearest inlet 1. This preserves the life of filter means 3 and increases the intervals between servicing.

Porous filter means 3 may be any suitable means for straining particulate matter and condensed water and oil droplets from air which passes through it. In one embodiment, porous filter means 3 may be one or more fine wire meshes. In another embodiment, it may comprise pig iron grains or another material arranged and installed in a dense mass. In an especially preferred arrangement, porous filter means 3 comprises an agglomeration of sintered metal particles such as tiny brass spheres.

Porous filter means 3 may be of arty suitable shape. In one arrangement, porous filter means 3 may be in the shape of one or more screens arranged between prefiltration chamber 2 and venturis 4. In another arrangement, porous filter means 3 may comprise a mass of filtering medium lying in the bottom of prefiltration chamber 2. In an especially preferred arrangement, porous filter means 3 is arranged inside prefiltration chamber 2 in a cylindrical, conical or frustoconical configuration, with a hollow central axis which leads out of prefiltration chamber 2 towards venturis 4. It is preferred that porous filter means 3 be sufficiently fine to remove particles larger than about 30 $\mu$m.

Particles, oil and condensation trapped by porous filter means 3 gradually accumulates on the filter means and at the bottom of prefiltration chamber 2 and may be removed during periodic servicing. The rate of accumulation is low so that servicing may be performed infrequently. In a typical truck air-brake system, servicing may be performed every 20,000 to 50,000 kms, with porous filter means 3 being replaced every 5 to 10 services.

Venturis 4 may be of any suitable shape and configuration. FIG. 3 illustrates a typical venturi having throat 7, converging walls 8 and diverging walls 9. Although any number of venturis may be used, it has been found that, in situations where an air-throughput of up to about 62 cubic feet per minute is required (1.75 m$^3$ per minute), the invention performs optimally with approximately 18 venturis, each venturi approximately 9 mm in length and each having a throat diameter of approximately 0.8 to 1.2 mm, a convergence angle $\alpha$ of approximately 15° to 20° and a divergence angle $\beta$ of approximately 5° to 7.5°. This arrangement is therefore suitable for a broad range of compressed air systems including truck braking systems. When a higher air-throughput is required, such as in train braking systems which have an air flow rate of around 470 cubic feet per minute (13 m$^3$ per minute), the size and number of venturis is increased.

Air passing through a venturi 4 undergoes very rapid expansion immediately after passing throat 7, and this expansion is accompanied by approximately adiabatic cooling, which results in the precipitation of vapour into droplets. Droplets may form around particulate matter which has passed through porous filter means 3, and such droplet formation further assists in the removal of the particles from the air stream. Experimental air filters made according to the present invention have been effective in removing contaminants and aerosols larger than about 2 μm by this process. In a preferred arrangement of the type illustrated in FIG. 3, air passing through venturis 4 may undergo subsonic expansion as it approaches throat 7, supersonic expansion on passing through throat 7, subsonic diffusion when passing between diverging walls 9 and inertial impaction upon leaving venturis 4.

It is preferred that immediately after the venturis 4, there be provided a condensation accumulator plate 10. Condensation accumulator plate 10 may be of any suitable configuration. Where venturis 4 are arranged in a circular pattern, it is preferred that plate 10 be substantially disc-shaped. Condensation accumulator plate 10 is arranged such that air leaving venturis 4 immediately strikes against plate 10 so that droplets in the air tend to accumulate on plate 10 then migrate around the sides of plate 10 and eventually down to the bottom of expansion chamber 5A, 5B.

Expansion chamber 5A, 5B may be of any suitable shape and configuration. It is preferred that expansion chamber 5A, 5B comprise internal chamber **5*a* an external chamber 5*b*, such that air passes down the inside of internal chamber 5*a* and then up through external chamber 5*b* around the outside of internal chamber 5*a* before passing out through outlet 6. This arrangement increases the amount of surfaces which the air must pass, thus increasing the probability of water and oil droplets being trapped on a surface. In an especially preferred arrangement, internal chamber 5*a* is substantially cylindrical with diameter of approximately 4 cm and a height of approximately 9 cm, while external chamber 5*b*** has an internal diameter of approximately 7 cm and a height of approximately 13 cm.

Inner chamber filter means 14 is preferably provided inside inner chamber **5*a*. Filter means 14 may be any suitable filter means, with a fine wire mesh or plastic mesh being especially preferred. Inner chamber filter means 14 assists further in the trapping of oil and water droplets. It has been found that the invention is especially effective if inner chamber filter means 14** comprises a plurality of meshes, and a preferred arrangement comprises 8 coarse meshes alternately interspersed with 8 fine meshes.

As a preferred refinement, flange 22 protrudes outwardly from the bottom of inner chamber **5*a*, so that only a small gap is left between flange 22 and casing 15. Flange 22** assists in trapping oil and water caught up in the rising existing airstream.

Outer chamber **5*b* is defined by casing 15. In previously known compressed air filters, casing 15 has been made from a machined block of metal. However, it is especially preferred that casing 15** be constructed from sheet metal.

It is preferred that inlet 1, outlet 6 and prefiltration chamber 2 all be housed within a housing 16, which engages firmly but removably with casing 15 by means of a screw thread 17. It is further preferred that inner chamber **5*a*, venturis 4 and porous filter means 3 are removably attachable to each other and together form a unit which is removable from housing 16** for cleaning purposes. Cleaning may be effected by washing the various parts in an appropriate solvent.

It is preferred that a conventional drain mechanism be provided at the foot 18 of casing 15.

In the embodiment illustrated in FIG. 1, air from outer chamber 5a passes through hole 19 and passage way 20 before passing out through outlet 6.

When the compressed air filter illustrated in FIG. 1 is in operation, air passes through inlet 1 and into prefiltration chamber 2. After striking baffle 21, it passes through porous filter means 3, which serves to remove particles and condensed droplets from the air stream. It then passes down through a central passage in porous filter means 3 towards venturis 4. On passing through throat 7 of venturis 4, the air undergoes a rapid expansion, accompanied by a rapid cooling which results in the precipitation of moisture in the form of droplets. These droplets immediately strike condensation accumulator plate 10 and they eventually migrate down the walls of inner chamber 5a and fall to the bottom 18 of outer chamber 5b. Droplets which are not trapped by baffle plate 10 may be trapped by the walls of inner chamber 5a or outer chamber 5b, or by inner chamber filter means 14 or flange 22. Air with contaminants substantially removed is then allowed to exit through outlet 6.

It has been found that the air filter of the present invention requires maintenance at substantially less frequent intervals than for other presently available filters. When maintenance is required, it may be effected conveniently and quickly, and there is seldom a need to replace worn parts.

It is to be understood that various additions, alterations and/or modifications may be made to the parts previously described without departing from the ambit of the invention.

What is claimed is:

1. An air filter comprising:
    an inlet for compressed air;
    a prefiltration chamber into which air enters from the inlet;
    porous filter means through which, air from the prefiltration chamber passes, to strain particulate matter from the air;
    a plurality of venturis through which air from the porous filter means passes;
    an expansion chamber in which air from the venturis expands and cools so that droplets of oil and water precipitate and accumulate at a bottom region of the expansion chamber; and
    an outlet from the expansion chamber.

2. An air filter according to claim 1 wherein the porous filter means is substantially cylindrical, conical or frusto-conical in shape with a flat base, such that air passes through the porous filter means into a substantially hollow core and out through the base towards the venturis.

3. An air filter according to claim 2 wherein the porous filter means comprises an agglomeration of sintered metal particles.

4. An air filter according to claim 1 further comprising a condensation accumulator plate in the expansion chamber directly adjacent the venturis such that air, oil and moisture from the venturis passes directly onto the condensation accumulator plate.

5. An air filter according to claim 1 further comprising filter meshes in the expansion chamber arranged such that air passes through the meshes before exiting.

6. An air filter according to claim 5 wherein the filter meshes comprise a plurality of alternating fine and coarse meshes.

7. An air filter according to claim 1 further comprising a baffle located between the inlet and the porous filter means in the prefiltration chamber.

8. An air filter according to claim 1 wherein the venturis are approximately 9 mm in length, with a throat size of approximately 0.8 to 1.2 mm, a convergence angle of approximately 15° to 20° and a divergence angle of approximately 5° to 7.5°.

* * * * *